United States Patent [19]

Hutter

[11] Patent Number: 4,963,051
[45] Date of Patent: Oct. 16, 1990

[54] DOWEL FASTENING DEVICE

[76] Inventor: Gerhard P. Hutter, 993 Lake Ave., Greenwich, Conn. 06830

[21] Appl. No.: 375,280

[22] Filed: Jul. 3, 1989

[51] Int. Cl.$^5$ .............................................. F16B 7/00
[52] U.S. Cl. .................................. 403/298; 411/451; 411/510
[58] Field of Search ................. 403/298; 411/451, 456, 411/510; 248/71; 52/704

[56] References Cited

U.S. PATENT DOCUMENTS

| 4,454,699 | 6/1984 | Strobl | 411/510 X |
| 4,609,170 | 9/1986 | Schnabl | 411/451 X |
| 4,633,640 | 1/1987 | Hutter | 52/704 |

FOREIGN PATENT DOCUMENTS

| 6504715 | 10/1965 | Netherlands | 248/71 |
| 428420 | 5/1935 | United Kingdom | 411/456 |

Primary Examiner—Andrew V. Kundrat
Attorney, Agent, or Firm—Alfred E. Miller

[57] ABSTRACT

A dowel fastening device having a plurality of pivoting conical members having saw-tooth gripping surfaces for insertion in aligned drilled holes of adjacent elements, such as furniture parts, or in heavy duty applications such as with support members for continuous pipe installations.

3 Claims, 4 Drawing Sheets

DOWEL FASTENING DEVICE

This invention relates to a fastening device for securing adjacent members of wood, or any other suitable materials, without the use of adhesive glue, nails, staples or the like.

DESCRIPTION OF THE PRIOR ART

My prior U.S. Pat. No. 4,633,640, issued on Jan. 6, 1987, is directed to a wall anchor having a shank portion provided with a plurality of members having both curved and straight side surfaces which are capable of limited pivotal movement when the shank is inserted in a wall opening to thereby grip the adjacent surfaces of the wall opening. The present dowel fastening device is an improvement over the above-described patent, and is particularly suitable for easy and rapid attachment of wood furniture parts, although not necessarily limited thereto.

SUMMARY OF THE INVENTION

It is a feature of the present invention to provide a dry dowel for insertion in a hole drilled in a furniture part, for example, a furniture leg, having a center dowel part, and a plurality of pivotal members on said dowel part, each having straight sides at right angles to each other and a curvilinear saw-tooth arrangement for functionally connecting adjacent wall surfaces in a hole.

It is an object of the present invention to provide a means for affixing two members together without the use of glue, nails, staples, and the like, but is reliably effective for the purposes intended.

It is a further object of the present invention to provide members on a dowel whereby when the dowel device is inserted in a drilled hole the diameter of the dowel is increased by means of pivoting friction hole gripping members when the dowel is pulled in the direction of removal from the hole.

An additional object of the present invention is to provide a dowel with a pair of opposing sets of pivoting hole gripping friction members on opposite sides of the dowel shank.

It is a another object of the present invention to provide a dowel device having a hole insertion limiting washer for the purpose of limiting the insertion of the dowel in the selected drilled-out hole.

In order that the present invention will be more clearly understood, it will now be disclosed in greater detail with reference to the accompanying drawings in which:

DESCRIPTION OF THE PREFERRED EMBODIMENTS

DESCRIPTION OF THE PREFERRED EMBODIMENTS

Referring particularly to FIGS. 1–5, a dry dowel device is shown, which is particularly suitable for securing parts of wood furniture together, but is not necessary limited thereto. As will be seen, each of the dowel devices which is referred to generally by the numeral 10 is provided with a shank 12 and a plurality of triangular-shaped members 14, that are pivotally attached to the shank 12. The members 14 are attached to the shank 12 at point 16 and each is provided with a curvilinear top surface.

Figure 6:
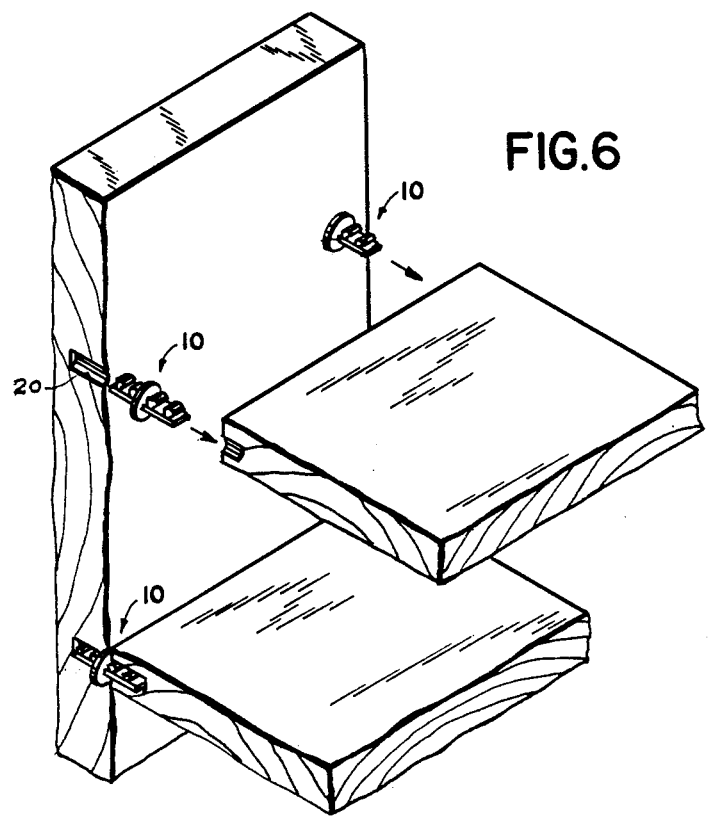
FIG. 6 shows a dowel device being inserted in openings in furniture parts.
Figure 7:
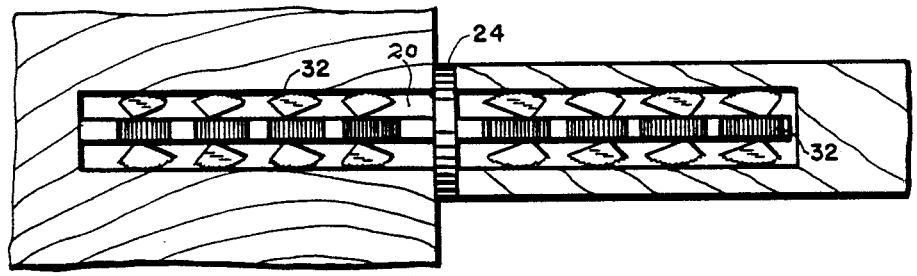
FIG. 7 is a side elevational view of the dowel device inserted and captured in the furniture parts of FIG. 6.
Figure 8:
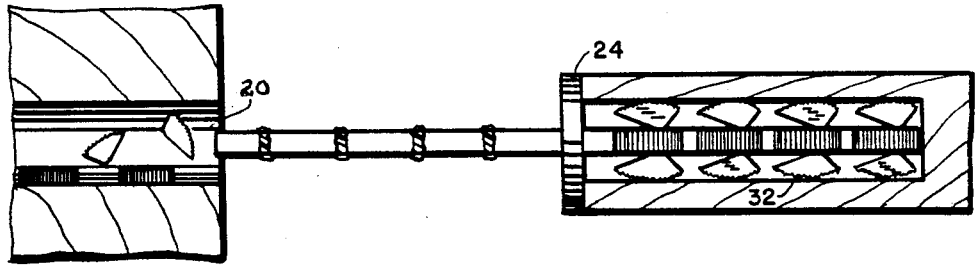
FIG. 8 is a side elevational view of the dowel device prior to connection of both furniture parts.

The gripping surface for each of the pivotal members 14 takes the form of a saw-tooth 18 on said curvilinear top surface wherein the gripping members of the saw-tooth extend substantially perpendicular to the plane of said member 14. It should be therefore noted from FIGS. 3 and 4 that the conical members when entering a drilled hole 20, as seen in FIGS. 6 and 7, the diameter of the dowel device 10 will be decreased, however when pressure is exerted on the dowel device to withdraw the device from the hole 20, the members 14 on the left hand side as seen in FIG. 7 will pivot in a counter-clockwise direction while the members 14 on the right hand side as seen in FIG. 7 thereby increasing the friction on the wall surfaces adjacent to the drilled hole. Thus, the gripping surface 18 of the of the members 14 provides a secure, fixed point, rather than relying on the force of the dowel outer surfaces engaging the surrounding wall of the hole.

The friction gripping surface of the members have the purpose of providing a secure, non-moving affixed point at the junction of the straight sides 21 and 22 of each member 14.

Figure 1:
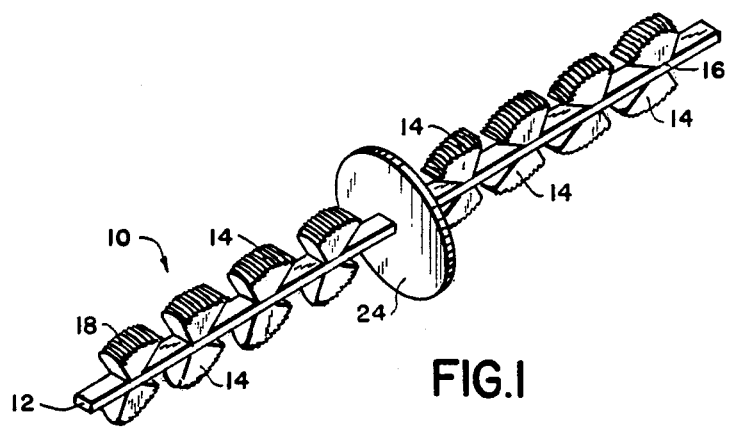
FIG. 1 is a perspective view of the dowel fastening device embodying the teachings of my invention.
Figure 2:
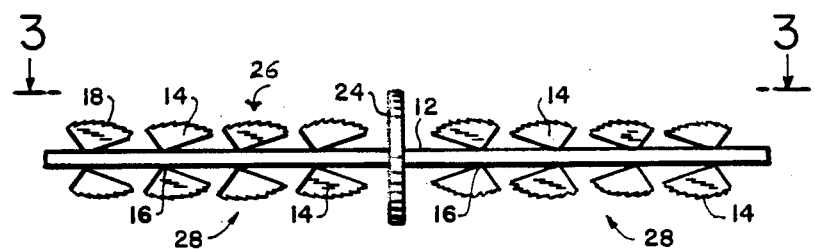
FIG. 2 is a side elevational view of the dowel fastening device.
Figure 3:
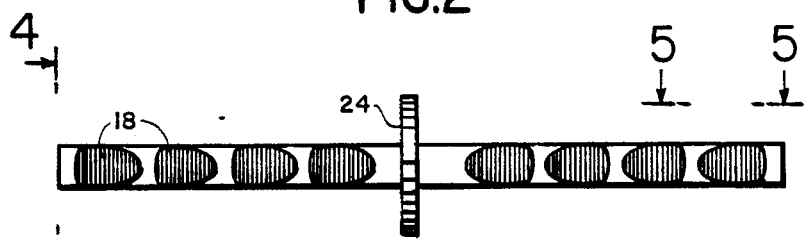
FIG. 3 is a view taken along the lines 3—3 of FIG. 2.
Figure 4:
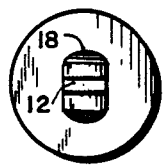
FIG. 4 is a view taken along the lines 4—4 of FIG. 3.
Figure 5:
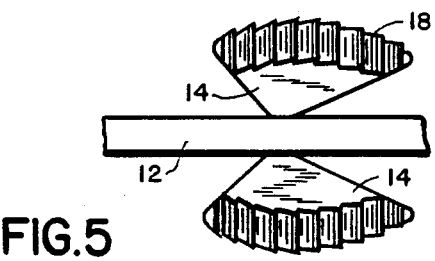
FIG. 5 is a view taken along the lines 5—5 of FIG. 3.

As seen in FIGS. 1-3, a washer-like ring 24 is located in the median portion of the shank 12 of the dowel device. Furthermore, as seen in FIG. 2, a mirror image assembly of members 14 is located on the opposite side of the shank 12. Thus, when the dowel device is inserted in a hole or opening with the members 14 having their saw-tooth profiles 18 engaging the adjacent interior hole surfaces, the washer ring 24 functions to form a stop thereby limiting the depth of penetration of the dowel in the respective hole.

It should be apparent that the use of the present dowel device with pivotal members having saw-tooth, gripping surfaces, and a limiting stop, with wood furniture parts, such as a leg and a table top, as seen in FIGS. 6 and 7 will result in a facile and effective securement without the use of adhesive glue, nails, staples and the like.

Referring to FIG. 2, a dowel device structure is shown having a set of pivotal members 14 on the upper part of the dowel shank 12 referred to generally by the reference numeral 26 and another set of pivotal members 14 on the lower part of the dowel shank and referred to generally by the numeral 28.

It should be apparent that in order to secure two adjoining members together, for example wood furniture parts, holes are drilled in the respective parts facing each other, and the holes are placed in aligment. Therefore, the dowel device is inserted first in one hole and the dowel is pulled in direction away from the hole causing the members 14 to pivot and the saw-tooth on each of the members to grab the inside of the hole to firmly hold one side of the dowel in place in the furniture part. The other part of the dowel with pivoting members 14 will then be inserted in the hole of the adjoining furniture part with the washer-like ring 24 functioning as a stop so that half of the dowel device is positioned in one furniture part while the other half is located in the other furniture part.

Figure 9:
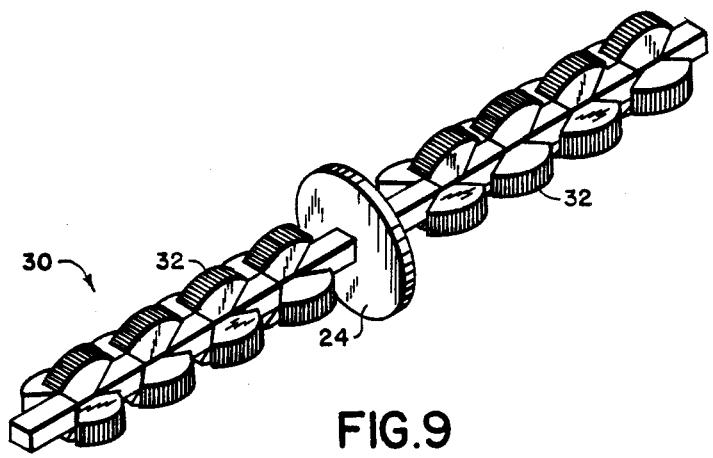
FIG. 9 is a perspective view of an alternate dowel fastening device construction.
Figure 10:
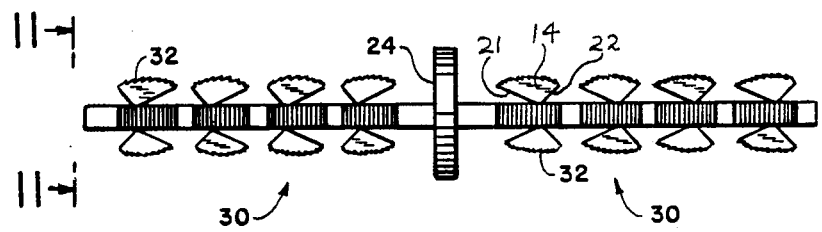
FIG. 10 is a side elevational view of the embodiment of the invention shown in FIG. 9.
Figure 11:
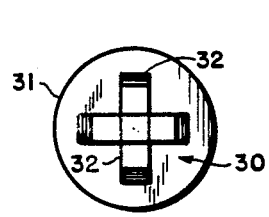
FIG. 11 is a view taken along the lines 11—11 of FIG. 10.
Figure 12:
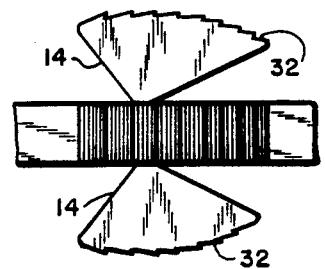
FIG. 12 is an enlarged side elevational view of a segment of the dowel device showing the details of construction of the pivoting members.
Figure 13:
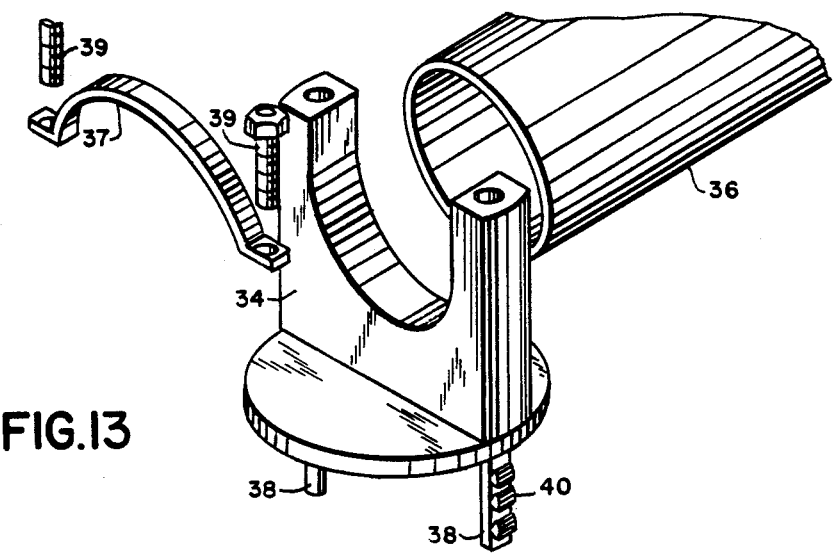
FIG. 13 is an exploded perspective view of a heavy duty application of the present invention of a support holder for a continuous piping.
Figure 14:
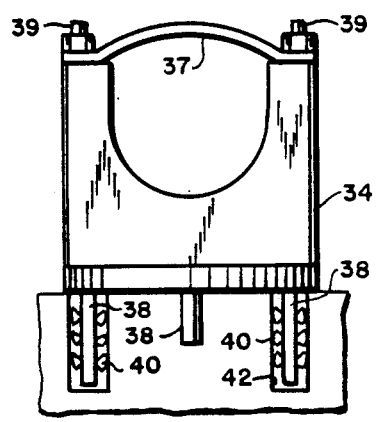
FIG. 14 is a front elevational view thereof.
Figure 15:
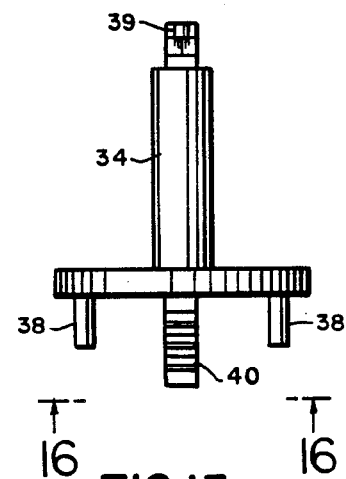
FIG. 15 is a side elevational view thereof.
Figure 16:
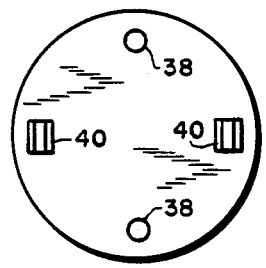
FIG. 16 is a top plan view thereof.

FIGS. 9-11 show another embodiment of the present invention in the form of a cross member referred to generally by the reference numeral 30 that can be inserted in a drilled hole 31, and which is capable of being fractured in order to remove the same from the hole, if it is desirable to remove the same. This dowel structure also utilizes a multiplicity of pivoting members 32 which are similar to pivoting members 14. It is also within the scope of the present invention to utilize, as a surgical procedure, the cross member 30 construction in drilled holes in human bone fractures for joining fractured bone segments together.

Referring to FIGS. 13-16, in which is shown a heavy duty application of the present invention, a cradle 34 is shown for holding and supporting a continuous pipe 36 and is provided with a bracket 37 and bolts 39. The cradle 34 is provided with a plurality of legs 38 having pivoting members 40. The relatively heavy structure is supported on the ground with legs 38 inserted in the excavated holes 42 in the ground. The pivoting members 40 are adapted to turn to a position whereby the members grab the wall of the holes and thereby securely hold the legs in position in the holes and thus consequently rigidly supporting the pipe 36. It is further within the scope of the present invention to provide the present dowel device fabricated of a themoplastic material, as well as any other suitable material.

Although the present invention had been disclosed and described with reference to various embodiments thereof, it should be apparent that other variations and modifications may be made, and it is intended in the following claims to cover each said variations and modifications as follows within the true spirit and scope of the invention.

What I claim is:

1. A dowel device for connecting and securing a structure together by adjacent wooden elements each having a drilled hole aligned with the adjacent drilled hole: comprising an elongated shank member of rectangular section provided with a plurality of rows of triangular-shaped pivoting members, each pivoting member having two straight sides connected at a point to a side of said shank and a curvilinear top gripping surface, said shank member being inserted in the drilled holes of said adjacent wooden elements to connect the same whereby said gripping surfaces of said pivoting members securely engage the walls of said respective drilled holes when a force is exerted on said dowel device to withdraw the latter from at least one of the drilled holes, said dowel device having a row of pivoting members on the top of said shank and a row of pivoting members on the bottom of said shank aligned with said top row, and a row of pivoting members on each of the sides of said shank located sub-stantially perpendicular to the top and bottom rows of pivoting members thereby creating a dowel device in the form of a cross, and the connection points of the pivoting members with the surfaces of the shank terminating at the corners of the shank sides to provide space between each row of pivoting members and the adjacent row thereof and thus allow fracture and removal capability when it is necessary to remove the same from one of the drilled holes.

2. A dowel device as claimed in claim 1 further comprising a washer-like ring mounted medially on said dowel device for limiting the penetration of the dowel device in the drilled holes.

3. A dowel device as claimed in claim 1 wherein said gripping surfaces are in the form of a saw tooth.

* * * * *